Aug. 7, 1928.
A. SCHERMER
OYSTER OPENER
Filed Dec. 10, 1927
1,679,787
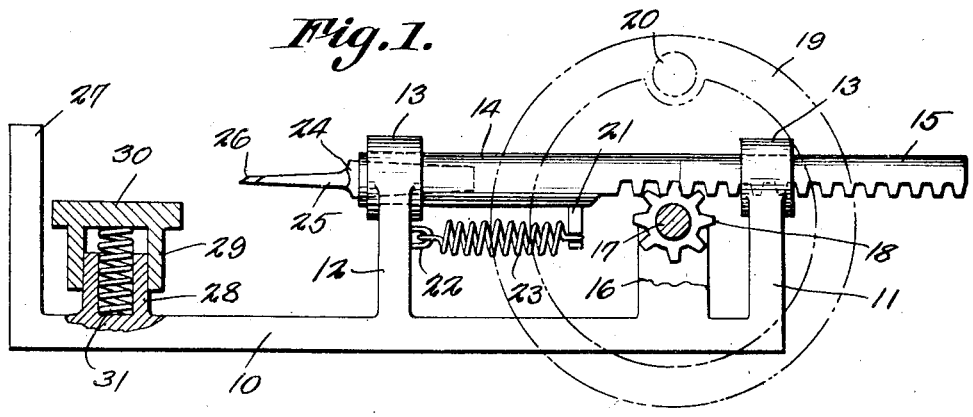
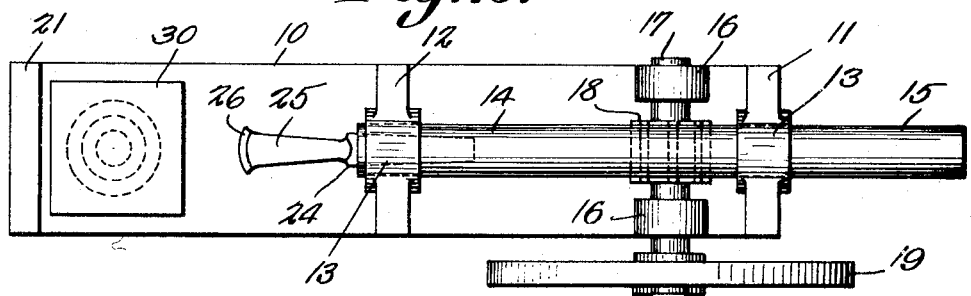
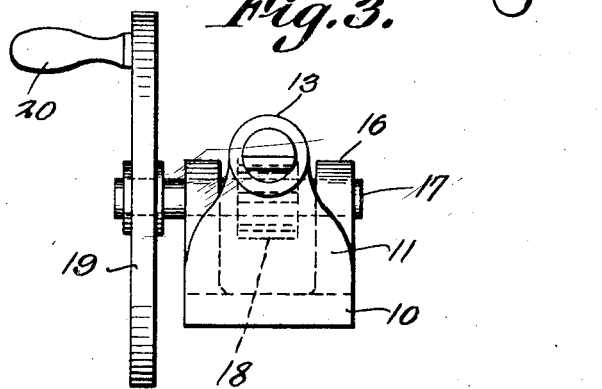
Inventor
Adolf Schermer,
By E. Chatton Brewington,
Attorney Patented Aug. 7, 1928.

1,679,787

UNITED STATES PATENT OFFICE.

ADOLF SCHERMER, OF BALTIMORE, MARYLAND.

OYSTER OPENER.

Application filed December 10, 1927. Serial No. 239,064.

This invention relates to oyster shucking machines and has special reference to an oyster opening machine for use in splitting the shells of an oyster apart preparatory to removing the oyster from its shell.

One important object of the invention is to provide an improved and simplified machine of this character wherein the operation of the device in opening the oyster will be effected by spring means.

A second important object of the invention is to provide a device of this kind having simple means in which oysters of different sizes may be properly positioned for the action of the opening tool.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side elevation, partly in section, of the improved machine.

Figure 2 is a plan view thereof.

Figure 3 is a rear end view thereof.

As is well known oysters and other bivalves have a shell which is hinged at the rear side and the two halves of this shell are held together to open and close on the hinge by a powerful muscle, the ends of which are attached to the respective valves near the hinge. Also it is well known that in order to effect opening of an oyster it is necesary to sever the muscle at one end from the valve since if a mere wedge is driven between the valve without severing the muscle the shell will close instantly the wedge is withdrawn.

The present device is arranged to provide for opening the shell and severing the muscle and in the embodiment here shown there is provided a base 10 having at its rear end an upwardly projecting standard 11 and a similar standard 12 about at its center. These standards carry alined guide sleeves or bearings 13 through which slides a tool bar having a cylindrical forward end 14 and a rear end 15 provided with rack teeth on its underside. Between the two standards 11 and 12 and adjacent the standard 11 a pair of bearings 16 extend upwardly from the base to support the transverse shaft 17. On this shaft is fixed a gear 18 which meshes with the rack on the tool bar. Also there is fixed on the shaft 17 an operating wheel 19 provided with a handle 20. Projecting downwardly from the cylindrical end 14 of the tool bar is a stud 21 and on the rear side of the standard 12 is an eye 22, a coiled tension spring 23 having its ends connected to this eye and stud respectively. In the front end of the cylindrical tool bar is a socket of the usual tapering form which receives the shank 24 of the opening tool or chisel 25 having an arcuate rod front end beveled on its top edge as shown at 26. At the forward end of the base 10 is a standard or stop 27 and adjacent this standard is a hollow boss 28 on which fits the hollow shank 29 of a table 30 which is urged to raised position by a coiled compression spring 31 seated in the hollow boss 28 and bearing against the underside of the table.

In operation the oyster is placed on the table 30 and rests against the stop 27. The chisel 25 is allowed to come forward until the table 30 is adjusted to proper height so that the chisel will strike the joint between the two valves of the oyster, the adjustment of the table being obtained by holding the oyster on it with the hand and forcing the table down to the proper distance against the action of the spring 31. The handle 20 is then turned to draw the chisel backwardly against the action of the spring 23 and is then released. Thereupon the spring 23 pulls the bar 14 forward and drives the chisel between the valves of the oyster, the bevel edge causing it to scrape along the inside of one valve and sever the muscle from that side. The chisel is then retracted and the oyster lifted off for removal from the shell by another operator.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In an oyster opener, a base having a stop mounted thereon, an oyster supporting table mounted upon the base adjacent said stop and movable along the stop, a horizontal movable tool bar mounted upon the base, a chisel movable over and from said table and carried by said bar, and means to actuate said bar.

2. In an oyster opener, a base having a stop mounted thereon, an oyster supporting table mounted upon the base adjacent said stop and movable along the stop, a horizontally movable tool bar mounted upon the base, a chisel carried by said bar, means to retract said bar, and spring means to force said bar forwardly.

In testimony whereof I affix my signature.

ADOLF SCHERMER.